United States Patent
Xiao et al.

(10) Patent No.: US 12,102,977 B2
(45) Date of Patent: Oct. 1, 2024

(54) BIOMASS-BASED POROUS CARBON COMPOSITE MATERIALS AND PREPARATION THEREOF AND APPLICATION IN $CO_2$ ADSORPTION

(71) Applicant: Southeast University, Nanjing (CN)

(72) Inventors: Rui Xiao, Nanjing (CN); Chao Liu, Nanjing (CN); Jiahuan Xu, Nanjing (CN); Beichen Xue, Nanjing (CN); Yuyang Fan, Nanjing (CN); Weicong Xu, Nanjing (CN); Xiangchen Kong, Nanjing (CN)

(73) Assignee: Southeast University, Nanjing (CN)

( * ) Notice: Subject to any disclaimer, the term of this patent is extended or adjusted under 35 U.S.C. 154(b) by 0 days.

(21) Appl. No.: 18/420,782

(22) Filed: Jan. 24, 2024

(65) Prior Publication Data

US 2024/0165583 A1 May 23, 2024

Related U.S. Application Data

(63) Continuation of application No. PCT/CN2023/101340, filed on Jun. 20, 2023.

(30) Foreign Application Priority Data

Aug. 15, 2022 (CN) .......................... 202210974590.2

(51) Int. Cl.
  *B01J 20/20* (2006.01)
  *B01D 53/04* (2006.01)
  *B01J 20/30* (2006.01)

(52) U.S. Cl.
  CPC .............. *B01J 20/20* (2013.01); *B01D 53/04* (2013.01); *B01J 20/3028* (2013.01);
  (Continued)

(58) Field of Classification Search
  CPC ...... B01J 20/20; B01J 20/3028; B01J 20/305; B01J 20/3085; B01D 53/04; B01D 2253/102; B01D 2257/504
  See application file for complete search history.

(56) References Cited

U.S. PATENT DOCUMENTS

2010/0304141 A1  12/2010  Kamegawa et al.

FOREIGN PATENT DOCUMENTS

| CN | 1052347 A | * | 6/1991 |
| CN | 101045535 A | | 10/2007 |

(Continued)

OTHER PUBLICATIONS

Machine translation of CN-1052347-A (Year: 1991).*

(Continued)

*Primary Examiner* — Samir Shah
*Assistant Examiner* — Logan Edward Laclair
(74) *Attorney, Agent, or Firm* — Bayramoglu Law Offices LLC

(57) ABSTRACT

A biomass-based porous carbon composite material and preparation thereof and an application thereof in $CO_2$ adsorption are provided. In the biomass-based porous carbon composite material, with a pulping black liquid solid as a precursor, by arc treatment, porous carbon structures capable of physically adsorbing $CO_2$ and basic substances capable of chemically adsorbing $CO_2$ are obtained; with lignin in the precursor as the carbon source, and sodium hydroxide, sodium salts, and small-molecular carbohydrate degradation products in the precursor as the template and activator, porous carbon structures are obtained by arc thermal carbonization and self-activation; the basic substances are obtained by allowing sodium hydroxide and sodium salts in the precursor to undergo arc thermal decomposition. Further, the present disclosure relates to an appli- (Continued)

cation of the biomass-based porous carbon composite material in $CO_2$ adsorption.

8 Claims, 2 Drawing Sheets

(52) U.S. Cl.
CPC ......... *B01J 20/305* (2013.01); *B01J 20/3085* (2013.01); *B01D 2253/102* (2013.01); *B01D 2257/504* (2013.01)

(56) References Cited

FOREIGN PATENT DOCUMENTS

| | | | |
|---|---|---|---|
| CN | 101460405 | A | 6/2009 |
| CN | 102701201 | A | 10/2012 |
| CN | 105633380 | A | 6/2016 |
| CN | 106167263 | A | 11/2016 |
| CN | 106622137 | A | 5/2017 |
| CN | 107452960 | A | 12/2017 |
| CN | 108715446 | A | 10/2018 |
| CN | 109433153 | A | 3/2019 |
| CN | 109809428 | A | 5/2019 |
| CN | 110394155 | A | 11/2019 |
| CN | 111760549 | A | 10/2020 |
| CN | 113816374 | A | 12/2021 |
| CN | 115445588 | A | 12/2022 |
| JP | 2009299196 | A | 12/2009 |
| WO | 2020157379 | A1 | 8/2020 |

OTHER PUBLICATIONS

GEA Reference 1.*
GEA Reference 2.*
Haz et al.(Chemical Composition and Thermal Behavior of Kraft Lignins, Forests, 2019) (Year: 2019).*
Dong-Wook Lee, et al., Flexible Synthetic Strategies for Lignin-Derived Hierarchically Porous Carbon Materials, ACS Sustainable Chemistry & Engineering, 2018, pp. 10454-10462, vol. 6.
Ju-Won Jeon, et al., Controlling Porosity in Lignin-Derived Nanoporous Carbon for Supercapacitor Applications, ChemSusChem Communications, 2015, pp. 428-432, vol. 8.
Song Yaoguang, Study on Templating Synthesis and Electrochemical Performance of Lignin-derived Mesoporous Carbon, Dissertation for the Degree Chinese Academy of Forestry, 2018, pp. 1-72.
Kaifang Fu, Preparation, characterization and application of lignin-based activated carbons from black liquor, Dissertation for Doctoral Degree Shandong University, 2018, pp. 1-119.
Zhou Wenjing, Synthese, Characterization and Applications of Comb-Like Pil Copolymer, Zhejiang University of Technology for the Degree of Master, 2015, pp. 1-65.
Ma Xiaoyu, et al., Research Progress on Preparation and Resource Utilization of Biomass Materials, Journal of Beijing University of Technology, 2020, pp. 1204-1212, vol. 46, No. 10.

* cited by examiner

BIOMASS-BASED POROUS CARBON COMPOSITE MATERIALS AND PREPARATION THEREOF AND APPLICATION IN $CO_2$ ADSORPTION

CROSS REFERENCE TO THE RELATED APPLICATIONS

This application is a continuation application of International Application No. PCT/CN2023/101340, filed on Jun. 20, 2023, which is based upon and claims priority to Chinese Patent Application No. 202210974590.2, filed on Aug. 15, 2022, the entire contents of which are incorporated herein by reference.

TECHNICAL FIELD

The present disclosure relates to carbon-based composite materials and in particular to a biomass-based porous carbon composite material and preparation thereof and an application in $CO_2$ adsorption.

BACKGROUND

Nowadays, it is a development trend and hot research topic to prepare high-quality biochars from renewable biomass resources. The biochar is usually prepared through pyrolysis carbonization or hydrothermal carbonization. The carbonization degree of biomass hydrochar is inferior to that of biomass pyrochar, and thus biomass hydrochar is generally applied to the lower-end application scenarios such as water pollutant adsorbents and the like, whereas those applied to the high-end applications need to undergo secondary pyrolysis carbonization. Due to the characteristic properties of biomass, it usually requires the use of a template for pore-forming during a carbonization process, and a carbonization product obtained hereby further needs to be activated to obtain performances required for the high-end applications. Generally speaking, there exist the problems of complex process, high energy consumption, many by-products (volatile organic compounds, organic wastewater, and the like), high cost, and need of further refining and the like, occurring to the biomass carbonization, which severely restricts its scale production and application.

Lignin, as one of three major components of lignocellulosic biomass, has high carbon content and its rich aromatic structure enables it to prepare a high-performance biochar more easily. Preparing biochar using industrial lignin as raw material can achieve harmless treatment and high value utilization of industrial wastes at the same time, bringing great significance.

In the prior arts, lignin-based biochars are mostly prepared with purified industrial lignin as raw material by adding templates and activators (ACS Sustainable Chemistry & Engineering 6 (2018) 10454-10462, ChemSusChem 8 (2015) 428-432, dissertation "Study on templating synthesis and electrochemical performance of lignin-based mesoporous carbon [D], Chinese Academy of Forestry, 2018", dissertation "Preparation, characterization and application of lignin-based activated carbons from black liquid [D], Shandong University, 2018", dissertation "Preparation of mesoporous carbon and composite material from lignin and application in electrochemistry [D], Zhejiang University of Technology, 2015", patent ZL201210207757.9, and patent ZL201811376052.3, and the like), while neglecting the source problems of industrial lignin and avoiding the costs of extracting and purifying lignin from pulping black liquid and the environmental burdens brought by the use of chemical agents. Although in the patents CN202010522079.X, CN201610697874.6, and ZL201210207757.9, a black liquid lignin porous carbon is mentioned, wherein with pulping black liquid as raw material, essentially, the lignin is first obtained by separation and then the porous carbon is prepared subsequently. Although lignin is a major solid ingredient of the pulping black liquid, the pulping black liquid solid also contains other organic substances (carbohydrate degradation products) and inorganic substances. But, direct use of full components of pulping black liquid is neglected in the existing preparation of lignin porous carbon.

The $CO_2$ adsorption on the surfaces of porous carbon benefits from specific surface area and pore volume, namely, the adsorption is mainly performed with the microspores and mesopores in the porous carbon. More micropore and mesopore structures can be obtained by controlling the preparation process of porous carbon, so as to improve $CO_2$ adsorption capacity. But, there exists an adsorption bottleneck for physical adsorption only, making it difficult to make significant breakthrough. In order to further increase the $CO_2$ adsorption capacity of porous carbons, heteroatoms (S, N, and P, and the like) are usually introduced into the porous carbon to create basic sites or combine with other basic materials to form a composite material, enabling $CO_2$ to be more easily adsorbed to the surfaces of porous carbon. However, these extra reagents and materials undoubtedly increase the costs of $CO_2$ adsorption of porous carbon.

SUMMARY

In order to overcome the shortcomings in the prior arts, the present disclosure provides a biomass-based porous carbon composite material, and preparation thereof and an application thereof in $CO_2$ adsorption, so as to achieve the full utilization of pulping black liquid and obtain a high-performance porous carbon composite material with physical and chemical sites for $CO_2$ adsorption, thereby avoiding the steps and costs of separating, extracting, and purifying lignin from the black liquid.

The present disclosure employs the following technical scheme.

The present disclosure provides a biomass-based porous carbon composite material, with pulping black liquid solid as a precursor, by arc treatment, porous carbon structures capable of physically adsorbing $CO_2$ and basic substances capable of chemically adsorbing $CO_2$ are obtained; with lignin in the precursor as the carbon source, and sodium hydroxide, sodium salts, and small-molecular carbohydrate degradation products in the precursor as the template and activator, the porous carbon structures are obtained by arc thermal carbonization and self-activation; the basic substances are obtained by allowing sodium hydroxide and sodium salts in the precursor to undergo arc thermal decomposition.

The porous carbon structures are controlled by changing carbonization working conditions.

The present disclosure further provides a preparation method of the biomass-based porous carbon composite material, comprising:
 drying pulping black liquid into a black liquid solid;
 under the protection of an inert gas, performing arc treatment on the black liquid solid to obtain a solid product;
 grinding the solid product to obtain the biomass-based porous carbon composite material.

An arc current in the arc treatment process is 10 to 1000 A and a processing time is 1 s to 10 min.

Drying the pulping black liquid into the black liquid solid comprises:

stirring the pulping black liquid uniformly, and immersing the pulping black liquid in a liquid nitrogen while stirring to quickly freeze the pulping black liquid and then drying by using a freeze-drying method to obtain the black liquid solid.

The pulping black liquid is at least one of soda pulping black liquid, soda anthraquinone pulping black liquid, Kraft pulping black liquid, organosolv pulping black liquid, chemomechanical pulping black liquid, and pulp washing black liquid.

The pulping black liquid is at least one of pulping black liquid from a laboratory, dilute black liquid from a pulp mill, and concentrated black liquid from a pulp mill.

The present disclosure further provides an application of the biomass-based porous carbon composite material in $CO_2$ adsorption.

The present disclosure has the following beneficial effects.

In the present disclosure, biomass carbonization is accomplished by using a high-temperature zone generated by arc and, compared with conventional hydrothermal carbonization and pyrolysis carbonization, has the advantages of low energy consumption, high efficiency, fast biomass carbonization and the like, as well as flexible process, simple operation, small occupation area of equipment, and good suitability for large-scale production.

In the present disclosure, with the full components of pulping black liquid as raw material, the high-performance porous carbon composite material can be obtained by one-step carbonization, which is different from the conventional process in which lignin is separated, extracted and purified from the black liquid and then added with a template and an activator and the like to achieve carbonization and pore-forming, thereby shortening the process line and simplifying the operation.

In the present disclosure, with the original sodium hydroxide, sodium salts and oligosaccharides in the black liquid solid as the template and activator for lignin carbonization and pore-forming and basic substance sources for $CO_2$ adsorption, there is no need to add the template and activator and other basic substances and basic materials, reducing the costs and increasing economic benefits.

In the present disclosure, the obtained porous carbon composite material has porous structures for $CO_2$ physical adsorption and basic substances for $CO_2$ chemical adsorption, needing no secondary treatment, and increasing $CO_2$ adsorption capacity greatly. Further, the porous structures of the porous carbon are highly developed with micropores and mesopores as main, and have high specific surface area and pore volume and are rich in surface oxygen functional groups, which provide a new idea of the high-value utilization of pulping black liquid, breaking through the limitation of conventional incineration treatment.

In the present disclosure, quick freezing is performed while uniformly stirring, such that the organic and inorganic substances are mixed uniformly to facilitate uniform pore-forming in subsequent carbonization. Further, the ice crystals generated during freezing can also act as the template such that the obtained solids are loose and porous, more helpful to formation of porous carbon structures at the terminal.

Other features and advantages of the present disclosure will be set forth in the subsequent specification and will partially become obvious from the specification or understood from the practice of the present disclosure.

BRIEF DESCRIPTIONS OF THE DRAWINGS

DETAILED DESCRIPTIONS OF THE EMBODIMENTS

Figure 1:
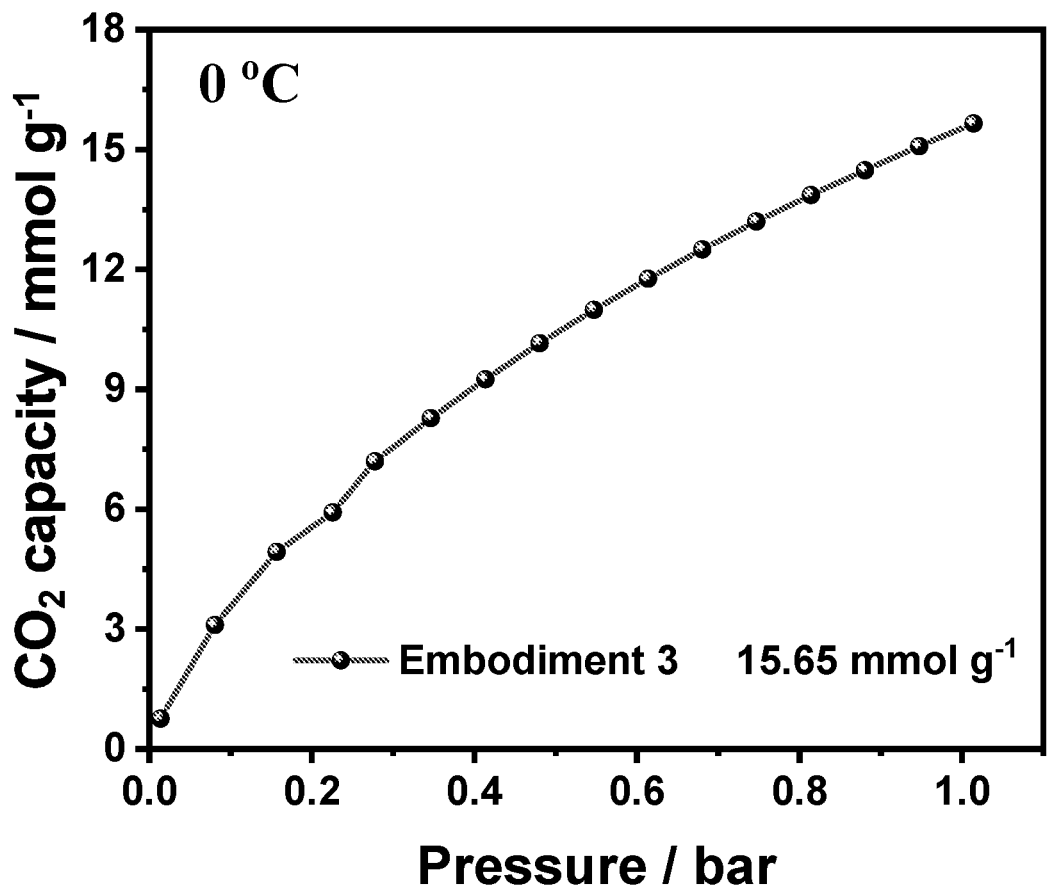
FIG. 1 is a $CO_2$ adsorption curve of a biomass-based porous carbon composite material obtained at the temperature of 0° C. according to an embodiment 3 of the present disclosure.

Specific embodiments of the present disclosure will be described below in combination with drawings.

The present disclosure provides a biomass-based porous carbon composite material.

The porous carbon structures can be controlled by changing carbonization working conditions, for example, by changing a carbonization time duration or an arc current or the like.

The present disclosure further provides a preparation method of the biomass-based porous carbon composite material, including:

In the present disclosure, with pulping black liquid solid as a precursor, one-step carbonization is performed by arc to obtain a porous carbon composite material for $CO_2$ adsorption, which avoids the steps and costs of separating, extracting and purifying lignin from the black liquid and achieves the full utilization of pulping black liquid. In this case, the obtained porous carbon composite material has the physical and chemical sites for $CO_2$ adsorption, leading to good performances.

The technical scheme of the preparation method of the biomass-based porous carbon composite material in the present disclosure will be further described below with specific embodiments.

Embodiment 1

The concentrated Kraft black liquid from a pulp mill was used as raw material and made into a black liquid solid by using the freeze-drying method, and then carbonized for 10 min at an arc zone of 10 A under the atmosphere of carbon dioxide, and then a solid product obtained was ground to obtain a porous carbon composite material. The porous carbon composite material had a $CO_2$ adsorption capacity of 11.05 mmol/g at the temperature of 0° C.

Embodiment 2

The concentrated Kraft black liquid from a pulp mill was used as raw material and made into a black liquid solid by using the freeze-drying method, and then carbonized for 1 min at an arc zone of 100 A under the atmosphere of helium, and then a solid product obtained was ground to obtain a porous carbon composite material. The porous carbon composite material had a $CO_2$ adsorption capacity of 13.99 mmol/g at the temperature of 0° C.

Embodiment 3

The concentrated Kraft black liquid from a pulp mill was used as raw material and made into a black liquid solid by using the freeze-drying method, and then carbonized for 30 s at an arc zone of 200 A under the atmosphere of neon, and then a solid product obtained was ground to obtain a porous carbon composite material. The porous carbon composite material had a $CO_2$ adsorption capacity of 15.65 mmol/g at the temperature of 0° C.

Embodiment 4

The concentrated Kraft black liquid from a pulp mill was used as raw material and made into a black liquid solid by using the freeze-drying method, and then carbonized for 1 s at an arc zone of 1000 A under the atmosphere of argon, and then a solid product obtained was ground to obtain a porous carbon composite material. The porous carbon composite material had a $CO_2$ adsorption capacity of 8.63 mmol/g at the temperature of 0° C.

Embodiment 5

The concentrated soda black liquid from a pulp mill was used as raw material and made into a black liquid solid by using the freeze-drying method, and then carbonized for 30 s at an arc zone of 200 A under the atmosphere of carbon dioxide, and then a solid product obtained was ground to obtain a porous carbon composite material. The porous carbon composite material had a $CO_2$ adsorption capacity of 12.98 mmol/g at the temperature of 0° C.

Embodiment 6

The dilute soda anthraquinone black liquid from a pulp mill was used as raw material and made into a black liquid solid by using the freeze-drying method, and then carbonized for 30 s at an arc zone of 200 A under the atmosphere of carbon dioxide, and then a solid product obtained was ground to obtain a porous carbon composite material. The porous carbon composite material had a $CO_2$ adsorption capacity of 12.03 mmol/g at the temperature of 0° C.

Embodiment 7

The dilute organosolv black liquid from a laboratory was used as raw material and made into a black liquid solid by using the freeze-drying method, and then carbonized for 30 s at an arc zone of 200 A under the atmosphere of carbon dioxide, and then a solid product obtained was ground to obtain a porous carbon composite material. The porous carbon composite material had a $CO_2$ adsorption capacity of 5.53 mmol/g at the temperature of 0° C.

Embodiment 8

The dilute chemomechanical black liquid from a pulp mill was used as raw material and made into a black liquid solid by using the freeze-drying method, and then carbonized for 30 s at an arc zone of 200 A under the atmosphere of carbon dioxide, and then a solid product obtained was ground to obtain a porous carbon composite material. The porous carbon composite material had a $CO_2$ adsorption capacity of 9.62 mmol/g at the temperature of 0° C.

Embodiment 9

The dilute pulp washing black liquid from a pulp mill was used as raw material and made into a black liquid solid by using the freeze-drying method, and then carbonized for 30 s at an arc zone of 200 A under the atmosphere of carbon dioxide, and then a solid product obtained was ground to obtain a porous carbon composite material. The porous carbon composite material had a $CO_2$ adsorption capacity of 6.96 mmol/g at the temperature of 0° C.

In the above embodiments, arc treatment may be specifically carried out by an arc furnace or the like. The arc zone refers to an arc thermal radiation zone of the arc furnace, that is, a zone where the black liquid solid is subjected to the arc thermal treatment.

Figure 2:
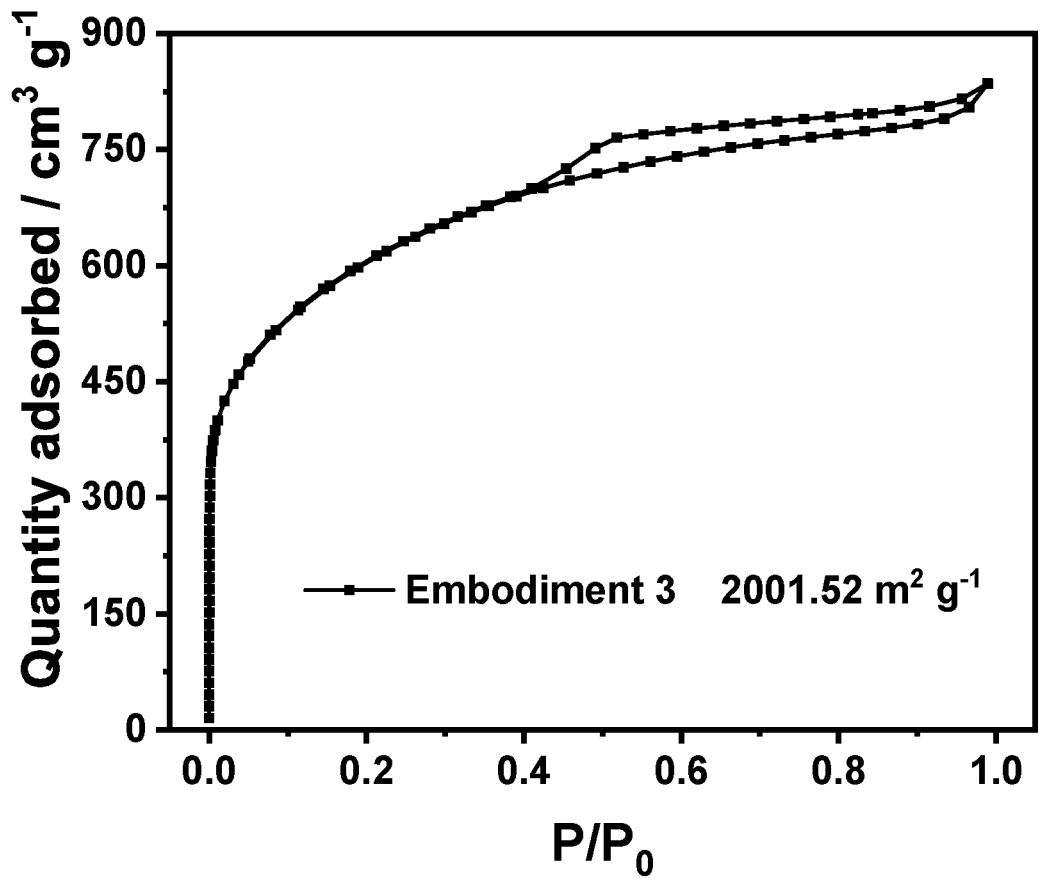
FIG. 2 is a curve of nitrogen adsorption and desorption of a biomass-based porous carbon composite material obtained according to an embodiment 3 of the present disclosure.

As shown in FIGS. 1 and 2, the porous carbon composite material obtained by performing carbonization of 30 s at an arc zone of 200 A under the atmosphere of neon can perform isothermal adsorption of $CO_2$ at 15.65 mmol/g under the pressure of 1 bar at the temperature of 0° C. The porous carbon has highly-developed pore structures with micropores and mesopores as main and has a specific surface area of as high as 2001.52 $m^2/g$.

Furthermore, unless otherwise clearly indicated, the order of processing elements and sequences, use of the digits and letters or use of other names in the present disclosure is not used to limit the order of the flows and methods in the present disclosure. Although some invention embodiments which are thought of as useful now are already discussed by using various examples as mentioned above, it should be understood that such details are only used for the purpose of descriptions and the appended claims are not limited to the disclosed embodiments. To the contrary, the claims are meant to cover all modifications and equivalent combinations consistent with the essence and scope of the embodiments of the present disclosure. For example, although the system components described above can be implemented by hardware device, they can also be implemented only by software solution, for example, the described systems are installed on the existing server or mobile device.

Finally, it should be understood that the embodiments in the present disclosure are used only to describe the principle of the embodiments of the present disclosure and other variations may also fall within the scope of protection of the present disclosure. Therefore, as an example rather than limiting, the substitute configurations of the embodiments of the present disclosure can be deemed as consistent with the teaching of the present disclosure. Correspondingly, the embodiments of the present disclosure are not limited to the embodiments clearly introduced and described in the present disclosure.

What is claimed is:

1. A preparation method of a biomass-based porous carbon composite material, comprising:
   drying pulping black liquid into a black liquid solid by stirring the pulping black liquid uniformly, and immersing the pulping black liquid in a liquid nitrogen while stirring to quickly freeze the pulping black liquid and then drying by using a freeze-drying method to obtain the black liquid solid, wherein the black liquid solid comprises lignin as carbon source, and sodium hydroxide, sodium salts, and small-molecular carbohydrate degradation products as a template and an activator;
   under the protection of an inert gas, performing arc carbonization treatment on the black liquid solid to obtain a solid product, wherein an arc current in the arc treatment process is 10 to 1000 A and a processing time is 1 s to 10 min;
   grinding the solid product to obtain the biomass-based porous carbon composite material, wherein the biomass-based porous carbon composite material comprises porous carbon structures capable of physically adsorbing $CO_2$ and basic substances capable of chemically adsorbing $CO_2$.

2. The preparation method of the biomass-based porous carbon composite material of claim 1, wherein the pulping black liquid is at least one of soda pulping black liquid, soda anthraquinone pulping black liquid, Kraft pulping black liquid, organosolv pulping black liquid, chemomechanical pulping black liquid, and pulp washing black liquid.

3. The preparation method of the biomass-based porous carbon composite material of claim 1, wherein the pulping black liquid is at least one of pulping black liquid from a laboratory, or black liquid from a pulp mill.

4. The preparation method of the biomass-based porous carbon composite material of claim 1, wherein the inert gas is selected from the group consisting of carbon dioxide, helium, neon, and argon.

5. The preparation method of the biomass-based porous carbon composite material of claim 1, wherein the biomass-based porous carbon composite material has a $CO_2$ adsorption capacity between 5.53 mmol/g and 15.65 mmol/g at a temperature of 0° C.

6. The preparation method of the biomass-based porous carbon composite material of claim 1, wherein the basic substances are obtained by allowing sodium hydroxide and sodium salts in the black liquid solid to undergo arc thermal decomposition.

7. The preparation method of the biomass-based porous carbon composite material of claim 1, wherein physical properties of the porous carbon structures are controlled by changing carbonization working conditions.

8. The preparation method of the biomass-based porous carbon composite material of claim 1, wherein the resulting biomass-based porous carbon composite material is used in $CO_2$ adsorption.

* * * * *